United States Patent
Chen et al.

(10) Patent No.: US 10,770,912 B2
(45) Date of Patent: Sep. 8, 2020

(54) CHARGING DEVICE AND CONTROL METHOD THEREOF

(71) Applicant: ANPEC ELECTRONICS CORPORATION, Hsinchu (TW)

(72) Inventors: Chih-Ning Chen, Taipei (TW); Chih-Heng Su, Hsinchu (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 52 days.

(21) Appl. No.: 16/286,771

(22) Filed: Feb. 27, 2019

(65) Prior Publication Data

US 2019/0190280 A1 Jun. 20, 2019

Related U.S. Application Data

(63) Continuation-in-part of application No. 15/198,446, filed on Jun. 30, 2016, now abandoned.

(30) Foreign Application Priority Data

Mar. 25, 2016 (TW) .............................. 105109451 A

(51) Int. Cl.
*H02J 7/00* (2006.01)
*H02M 3/158* (2006.01)

(52) U.S. Cl.
CPC ............... *H02J 7/008* (2013.01); *H02J 7/00* (2013.01); *H02M 3/158* (2013.01); *H02M 3/1582* (2013.01); *H02J 2207/20* (2020.01)

(58) Field of Classification Search
CPC ...................................................... H02J 7/008

USPC ......................................................... 320/107
See application file for complete search history.

(56) References Cited

U.S. PATENT DOCUMENTS

| | | | | |
|---|---|---|---|---|
| 6,118,254 A * | 9/2000 | Faulk | ................... | H02J 7/0068 320/128 |
| 8,536,840 B2 * | 9/2013 | Walter | ................ | H02M 3/1582 323/223 |
| 8,593,115 B2 * | 11/2013 | Walter | ................ | H02M 3/1582 323/222 |
| 8,674,673 B2 * | 3/2014 | Hung | .................. | H02M 3/1588 323/283 |
| 2014/0015503 A1 * | 1/2014 | Cheng | ................. | H02M 3/1588 323/282 |
| 2016/0329734 A1 * | 11/2016 | Lee | ...................... | H02M 3/156 |

* cited by examiner

*Primary Examiner* — Jerry D Robbins
(74) *Attorney, Agent, or Firm* — Li & Cai Intellectual Property (USA) Office

(57) ABSTRACT

A charging device and a control method thereof are provided. The charging device includes an adapter, an energy storage unit and a charging module. The adapter provides an adapter current. The charging module receives the adapter current and provides a first charging current to charge the energy storage unit, or an output current to charge an electronic device. When the input current is larger than a first preset current and the first charging current is equal to or less than a third preset current, the charging module operates in a boost mode, such that the energy storage unit provides a second charging current to the charging module. When the second charging current is larger than the third preset current, the charging module enters a buck mode such that the energy storage unit is charged by the first charging current.

14 Claims, 7 Drawing Sheets

CHARGING DEVICE AND CONTROL METHOD THEREOF

CROSS-REFERENCE TO RELATED PATENT APPLICATION

This application is a continuation-in-part application of and claims the priority benefit of a prior application Ser. No. 15/198,446, filed on Jun. 30, 2016, now pending, which claims the priority benefits of Taiwan application serial no. 105109451, filed on Mar. 25, 2016. The entirety of each of the above patent applications is hereby incorporated by reference herein and made a part of this specification.

BACKGROUND OF THE INVENTION

1. Field of the Invention

The present disclosure relates to a charging device; in particular, to a charging device that can provide an electric energy safely and effectively.

2. Description of Related Art

With the development of technology, portable electric devices have become essential in people's lives, such as the mobile phone, the tablet, the music player, the video player or the like that have an USB interface.

Usually, the portable electric devices consume power quickly, so the users are used to keeping a charging device, such as a power bank, at hand to charge their portable electric devices if necessary. The charging device is usually an OTG (On The Go) device. In other words, the charging device can be a peripheral device to receive power from other devices, such as a personal computer, or can be a host device to charge other slave devices, such as the mobile phone, the tablet or the like. Moreover, a recently developed charging device can provide the electric energy to the mobile phone, the tablet or the like as it is charged.

The above charging device has a buck converter and a boost converter. The buck converter and the boost converter respectively include an upper bridge switch and a lower bridge switch. When the charging device needs to be charged, the charging device enables a buck converter and makes the voltage of a commercial power convert to a proper level by adjusting the duty cycle of the upper bridge switch and the lower bridge switch of the buck converter. On the other hand, when the charging device needs to charge an electronic device, the charging device enables a boost converter and provides an electric energy of which the voltage has been stepping up to a proper level by adjusting the duty cycle of the upper bridge switch and the lower bridge switch of the boost converter. Briefly, a traditional charging device works by a buck converter and a boost converter.

The working principle of the traditional charging device is as follows. Receiving commercial power, an adapter of the traditional charging device can provide a current. If the maximum of the current is, for example, 1 A but an electric device to be charged needs a 1.5 A current, and the electric energy provided by the adapter is apparently insufficient for the electric device. As a result, the charging device enables the boost converter, such that the battery in the charging device can also provide electric energy to the electronic device. In other words, the adapter provides a 1 A current and the battery provides a 0.5 A current and thus the electric device can receive a 1.5 A current.

However, the traditional charging device has certain problems. One of them is that, with the decrease of a load of the electric device, the electronic device may only need 1.2 A current. However, in the above example, the current provided by the battery to the electronic device is still 0.5 A and thus the adapter only needs to provide a 0.7 A current to the electronic device. The current provided by the adapter decreases, so the traditional charging device wrongly detects that the electric energy provided by the adapter is sufficient for the electric energy needed by the electric device, and turns to enable the buck converter and starts to charge the battery. Nevertheless, the adapter cannot provide a sufficient electric energy to the electronic device, and eventually the traditional charging device will again turn to enable the boost converter so that the battery can provide part of electric energy that the electric device needs. Briefly, the traditional charging device keeps changing its working mode (for example, from the buck converter to the boost converter, or from the boost converter to the buck converter), and thus is unable to provide electric energy to the electric device stably.

Additionally, another problem that the traditional charging device is that, there is a period of time needed for the traditional charging device to wait for its processor to determine what kind of control signal should be sent to change its working mode (for example, from the buck mode to the boost mode, or from the boost mode to the buck mode). Thus, the traditional charging device may not be able to immediately provide electric energy to an electronic device. In other words, there must be a wait time before the traditional charging device responds to a request for charging from an electric device.

SUMMARY OF THE INVENTION

The present disclosure provides a charging device that is used to charge an electronic device. The charging device includes an adapter, an energy storage unit and a charging module. The adapter provides an adapter current. The energy storage unit receives a first charging current and provides a second charging current. The charging module is connected to the adapter, the energy storage unit and the electronic device. The charging module receives the adapter current and the second charging current, provides the first charging current to the energy storage unit and provides an output current to the electronic device. The charging module includes a detecting unit, an upper bridge switch and a lower bridge switch. The detecting unit includes a first current sense amplifier, a first error amplifier, a first comparator, a second current sense amplifier, a second error amplifier, a second comparator, a third current sense amplifier and a third comparator. The first current sense amplifier has a first sense input terminal connected to a node between the adapter and a first terminal of a first transistor, and a second sense input terminal connected to a second terminal of the first transistor. The first error amplifier has a first error input terminal connected to a first reference voltage source, and a second error input terminal connected to an output terminal of the first current sense amplifier and a first current source. The first comparator has a first comparator input terminal connected to an output terminal of the first error amplifier, and a second comparator input terminal connected to a first ramp generator. The second current sense amplifier has a third sense input terminal connected to a node between the energy storage unit and a first terminal of a second transistor, and a fourth sense input terminal connected to a second terminal of the second transistor. The second error amplifier has a third error input terminal connected to a second reference voltage source, a four error input terminal connected to the output terminal of the first current sense amplifier and the first current source, and a fifth error input terminal connected to an output terminal of the second current sense amplifier and a second current source. The second comparator has a third comparator input terminal connected to an output terminal of the second error amplifier, and a fourth comparator input terminal connected to a second ramp generator. The third current sense amplifier has a fifth sense input terminal connected to the second terminal of the second transistor, and a second sense input terminal connected to the node between the energy storage unit and the first terminal of the second transistor. The third comparator has a fifth comparator input terminal connected to the output terminal of the first current sense amplifier and the first current source, and a sixth comparator input terminal connected to an output terminal of the third current sense amplifier and a third current source. The upper bridge switch has an upper control terminal connected to an output terminal of the first comparator, a first upper input terminal connected to the second terminal of the first transistor and the electronic device, and a second upper input terminal connected to the second terminal of the second transistor. The lower bridge switch has a lower control terminal connected to an output terminal of the second comparator, a first lower input terminal connected to the second upper input terminal of the upper bridge switch and the second terminal of the second transistor, and the second lower input terminal of the lower bridge switch is grounded.

The present disclosure further provides a control method used in the above charging device. The control method includes the following steps: step A: detecting the input current flowing through the first transistor; step B: determining whether the input current flowing through the first transistor is sensed by the first current sense amplifier and larger than the first preset current and the first charging current that is provided to the energy storage unit from the charging module and sensed by the third current sense amplifier and is equal to or less than a third preset current or not, in response to determining that the input current not being larger than the first preset current or the first charging current not being equal to or less than the third preset current, performing step C, in response to determining that the input current being larger than the first preset current and the first charging current being equal to or less than the third preset current, performing steps D and E; step C: controlling the charging module to operate in the buck mode, adjusting the duty cycle of the upper bridge switch and the duty cycle of the lower bridge switch by the buck control logic, such that the energy storage unit is charged by the first charging current; step D: controlling the charging module to operate in the boost mode, and adjusting the duty cycle of the upper bridge switch and the duty cycle of the lower bridge switch by the boost control logic, such that the energy storage unit provides the second charging current to the charging module; and step E: determining whether the second charging current sensed by the third current sense amplifier and is larger than the third preset current or not, in response to determining the second charging current not being larger than the third preset current, performing step D, in response to determining the second charging current being larger than the third preset current, controlling the charging module to enter the buck mode from the boost mode.

To sum up, when the load of an electronic device is a heavy load, the charging device and the control method thereof provided by the present disclosure can maintain the input current provided by the adapter at a safe current level, and helps the adaptor via the energy storage unit provide electric energy to the electronic device. Thereby, the adapter will not be damaged by a high output power thereof. Moreover, the charging device and the control method thereof provided by the present disclosure can dynamically adjust the second charging current provided by the energy storage unit, and can directly detect the second charging current to determine whether to end the boost mode of the charging module. Compared with an energy storage unit of a traditional charging device that can only provide a constant current, the charging device and the control method thereof provided by the present disclosure will not make the charging device work in a wrong mode due to variation or sudden change of the input voltage provided by the adapter.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

It will be understood that, although the terms first, second, third, and the like, may be used herein to describe various elements, but these elements should not be limited by these terms. These terms are only to distinguish one element, component, region, layer, or section from another element, component, region, layer, or section discussed below. Thus, a first element, component, region, layer, or section discussed below could be termed a second element, component, region, layer, or section without departing from the teachings of the present disclosure. As used herein, the term "and/or" includes any and all combinations of one or more of the associated listed items.

Figure 1:
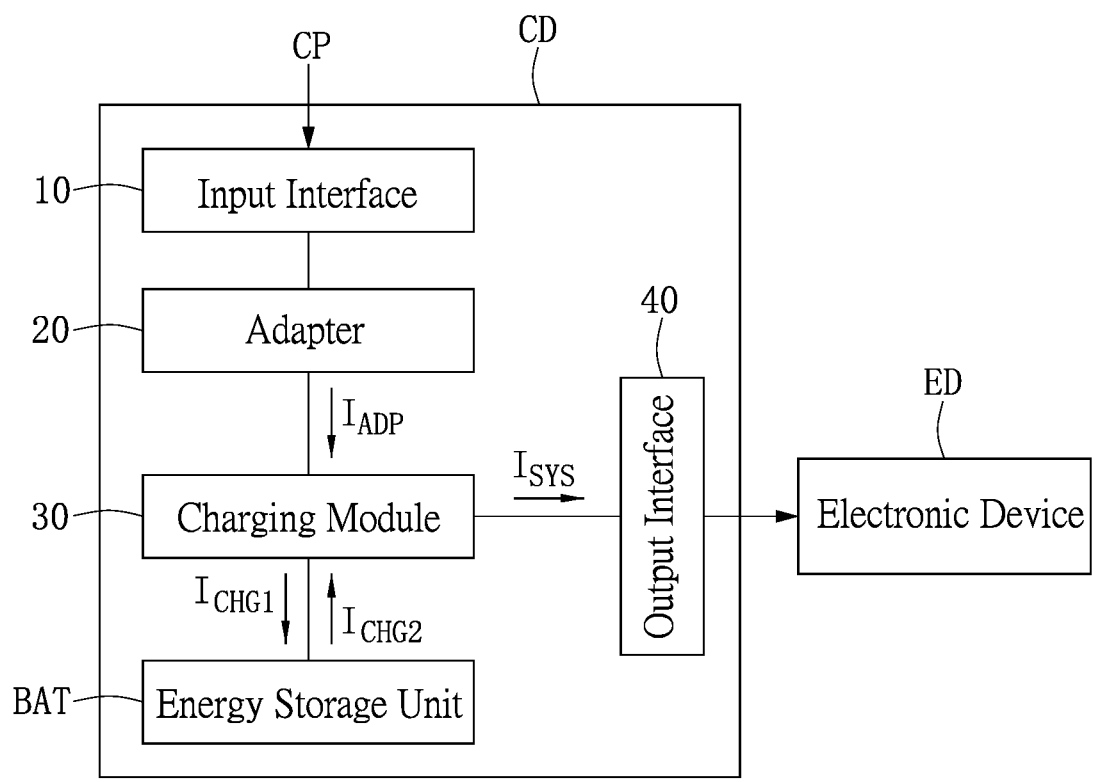
FIG. 1 is a block diagram of a charging device of a first embodiment of the present disclosure.

Reference is made to FIG. 1, which is a block diagram of a charging device of a first embodiment of the present disclosure. The charging device CD can be, for example, a power bank, which is an OTG device. Briefly, the charging device CD can receive and convert commercial power CP into another form of electric energy and store the electric energy. The charging device CD can also provide the stored electric energy to other electric devices. The charging device CD includes at least one input interface 10, an adapter 20, a charging module 30, an energy storage unit BAT and at least one output interface 40. The adapter 20 is connected to the input interface 10 and the charging module 30. The charging module 30 is connected to the energy storage unit BAT and the output interface 40. In addition, an electronic device ED is connected to the output interface 40.

The electronic device ED can be, for example, a mobile phone, a tablet, a music player or a video player having a USB interface, but it is not limited herein. The electronic device ED receives an output current ISYS provided by the charging module 30 via the output interface 40, and the electronic device ED is charged according to the output current ISYS.

The input interface 10 can be, for example, a universal serial bus (USB) interface, to receive commercial power CP and output the received commercial power CP to the adapter 20. In addition, for ease of understanding, the charging device CD includes only one input interface 10 in this embodiment, but it is not limited herein. In other embodiments, the charging device CD can include more than one input interface 10, which can make the charging device CD charge much more quickly.

The output interface 40 can also be a universal serial bus (USB) interface, to output the electric energy stored in the charging device to the corresponding electronic device ED. For ease of understanding, the charging device CD includes only one output interface 40 in this embodiment, but it is not limited herein. In other embodiments, the charging device CD can include more than one output interface 40 and each output interface 40 is connected to one electronic device ED, which makes the charging device CD able to charge a plurality of electronic devices simultaneously.

The energy storage unit BAT can be, for example, a battery that can store the received power or can convert the stored power into electric energy that can be used by the electronic device ED.

The adapter 20 includes proper logics, circuits or codes and is configured to step up or step down the voltage of the commercial power according to the Farady's law. In addition, the adapter 20 further includes a rectifying circuit. The rectifying circuit of the adapter 20 converts the commercial power into a direct voltage and provides the direct voltage to the charging module 30.

The adapter 20 provides an adapter current to the charging module 30. The charging module 30 receive the adapter current and provides a first charging current ICHG1 to charge the energy storage unit BAT or provides an output current ISYS to charge the electronic device ED. The charging module 30 can work in a boost mode or a buck mode according to a present working state of the charging device CD, to charge the energy storage unit BAT or the electronic device ED. When the charging module 30 is working in the buck mode, it provides electric energy to both the energy storage unit BAT and the electronic device ED according to the adapter current. When the energy storage unit BAT can store no more electric energy, the charging module 30 only charges the electronic device ED. On the other hand, when the charging module 30 is working in the boost mode, the charging module 30 provides electric energy to the electronic device ED, and the energy storage unit BAT provides power to the charging module 30. After that, the charging module 30 outputs an output current ISYS for providing the electric energy that the electronic device needs. It should be noted that, the output current ISYS equals to a sum of the input current IADP and the current provided by the energy storage unit BAT.

Figure 2:
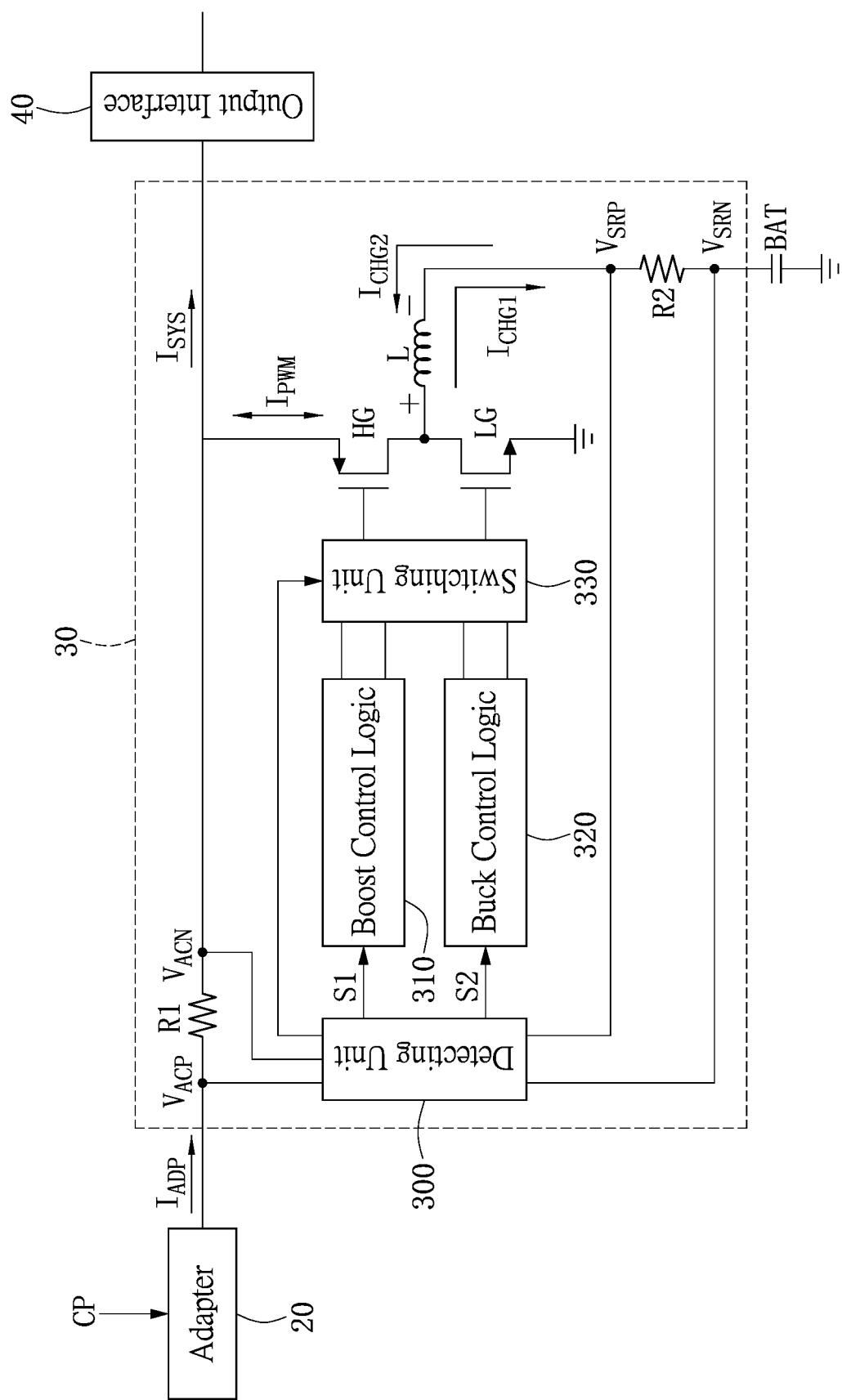
FIG. 2 is a circuit layout diagram of a charging module of the charging device of the first embodiment of the present disclosure.

The charging module 30 is described in detail as follows. Reference is made to FIG. 2, which is a circuit layout diagram of a charging module of the charging device of the first embodiment of the present disclosure. The charging module 30 includes a detecting unit 300, a boost control logic 310, a buck control logic 320, a switching unit 330, an upper bridge switch HG, a lower bridge switch LG, an inductor L, a first resistor R1 and a second resistor R2. The first resistor R1 is connected to the adapter 20. The second resistor R2 is connected to the energy storage unit BAT. The detecting unit 300 is connected to the boost control logic 310, the buck control logic 320, two ends of the first resistor R1 and two ends of the second resistor R2. The switching unit 330 is connected to the boost control logic 310, the buck control logic 320, the detecting unit 300, the upper bridge switch HG and the lower bridge switch LG. The boost control logic 310 is connected to a gate of the upper bridge switch HG and a gate of the lower bridge switch LG via the switching unit 330. The buck control logic 320 is connected to the gate of the upper bridge switch HG and the gate of the lower bridge switch LG via the switching unit 330. The upper bridge switch HG is connected to the adapter 20, the output interface 40 and a first end of the inductor L. The lower bridge switch LG is connected to the upper bridge switch HG and the first end of the inductor L. A second end of the inductor L is connected to a first end of the second resistor R2. A second end of the second resistor R2 is connected to a first end of the energy storage unit BAT. A second end of the energy storage unit BAT is grounded.

In addition, in this embodiment, the upper bridge switch HG is a PMOS transistor, and the lower bridge switch LG is a NMOS transistor, but it is not limited herein. In other embodiments, the upper bridge switch HG and the lower bridge switch LG can be a PMOS transistor, a NMOS transistor or the like.

A source of the upper bridge switch HG is connected to the adapter 20 to receive the adapter current provided by the adapter 20. A drain of the lower bridge switch LG is connected to a drain of the upper bridge switch HG and the first end of the inductor L. A source of the lower bridge switch LG is grounded.

Working mechanisms of the upper bridge switch HG and the lower bridge switch LG are related to a current passing through the inductor L. Specifically, the first charging current ICHG1 flowing towards the energy storage unit BAT or the second charging current ICHG2 provided by the energy storage unit BAT can be controlled by controlling a duty cycle of the upper bridge switch HG and a duty cycle of the lower bridge switch LG. The second charging current ICHG2 flows towards a direction opposite to a flowing direction of the first charging current ICHG1. The second charging current ICHG2 varies with a change of a load of the electronic device ED. When the electronic device ED needs more electric energy, the voltage VACN of one end of the first resistor R1 drops. To maintain the voltage VACN, the adapter 20 increases the adapter current such that the input current IADP increases. If the input current IADP is too much, the second charging current ICHG2 provided by the energy storage unit BAT will be increased, such that the adapter 20 can provide less electric energy to the electronic device ED, and makes the adapter 20 supply the adapter current at a safe current level.

On the contrary, when the electronic device ED needs less electric energy, the voltage VACN of one end of the first resistor R1 is raised. After that, the adapter 20 decreases the adapter current such that the input current IADP decreases, and the energy storage unit BAT decreases the second charging current ICHG2.

The detecting unit 300 includes proper logics, circuits or codes and is configured to detect the input current IADP flowing through the first resistor R1 and to output a first detecting signal S1 to the boost control logic 310, wherein the first detecting signal S1 indicates the magnitude of the input current IADP. For example, the detecting unit 300 includes a plurality of comparators. A first comparator (not shown in FIG. 2) of the detecting unit 300 is configured to determine the magnitude relationship between the input current IADP and a preset current. Specifically, the detecting unit 300 detects the voltages VACP and VACN of two ends of the first resistor R1 and determines the magnitude of the input current IADP according to the voltage difference between two ends of the first resistor R1 (that is, the difference between the voltages VACP and VACN). One input end of the first comparator receives the input current IADP, and another input end of the first comparator receives the preset current. The first comparator determines whether the input current IADP is equal to or larger than the preset current. If the input current IADP is equal to or larger than the preset current, the first comparator outputs the first detecting signal S1 at high level to the boost control logic 310 and the switching unit 330.

It should be noted that, the magnitude of the preset current is not restricted herein, and those skilled in the art can adjust the preset current depending on need.

The detecting unit 300 also detects the second charging current ICHG2 provided by the energy storage unit BAT and outputs a second detecting signal S2 to the buck control logic 320, wherein the second detecting signal S2 indicates the magnitude of the second charging current ICHG2. In the above example, a second comparator (not shown in FIG. 2) of the detecting unit 300 determines the magnitude of the second charging current ICHG2. Specifically, the detecting unit 300 detects the voltages VSRP and VSRN of two ends of the second resistor R2, and determines the magnitude of the second charging current ICHG2 according to the voltage difference between two ends of the second resistor R2 (that is, the difference between the voltages VSRP and VSRN). One input end of the second comparator receives the second charging current ICHG2, and the second comparator determines whether the second charging current ICHG2 is equal to or larger than 0. If the second charging current ICHG2 is equal to or larger than 0, the second comparator outputs the second detecting signal S2 at high level to the buck control logic 320 and the switching unit 330.

The boost control logic 310 includes proper logics, circuits or codes and is configured to control the charging module 30 to work in the boost mode. When the boost control logic 310 receives the first detecting signal S1 at high level provided by the detecting unit 300, the boost control logic 310 outputs a first pulse width modulation signal to the upper bridge switch HG and a second pulse width modulation signal to the lower bridge switch LG, to adjust the duty cycle of the upper bridge switch HG and the duty cycle of the lower bridge switch LG. The details about how the boost control logic 310 adjusts the duty cycle of the upper bridge switch HG and the duty cycle of the lower bridge switch LG are illustrated in the following.

Figure 3:
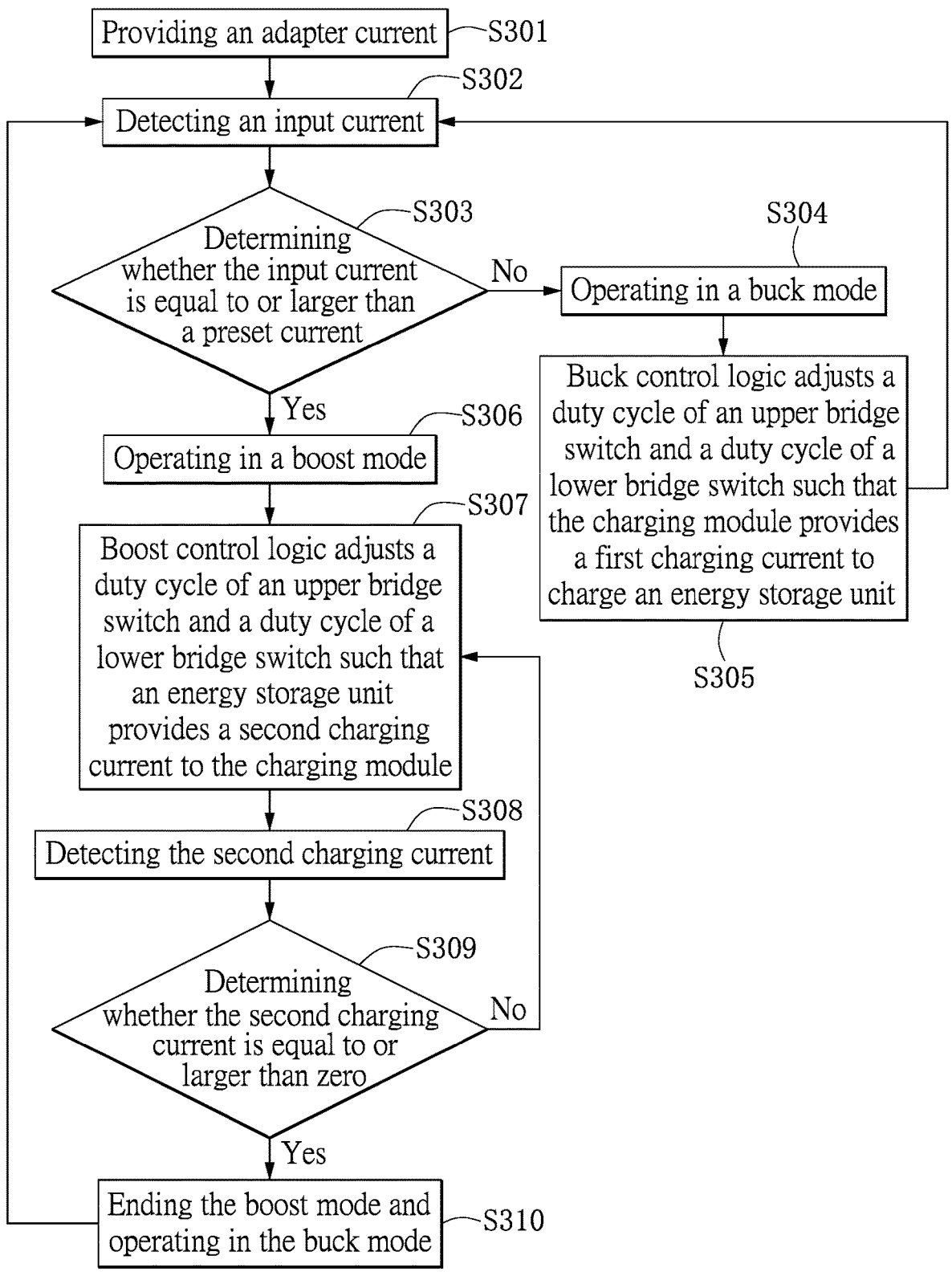
FIG. 3 is a flowchart diagram of a control method used in the charging device of the first embodiment of the present disclosure.

Reference is made to FIG. 3, which is a flowchart diagram of a control method used in the charging device of the first embodiment of the present disclosure.

The buck control logic 320 includes proper logics, circuits or codes and is configured to control the charging module 30 to work in the buck mode. When the buck control logic 320 receives the second detecting signal S2 at high level provided by the detecting unit 300, the buck control logic 320 outputs a third pulse width modulation signal to the upper bridge switch HG and outputs a fourth pulse width modulation signal to the lower bridge switch LG, to adjust the duty cycle of the upper bridge switch HG and the duty cycle of the lower bridge switch LG. The details about how the buck control logic 320 adjusts the duty cycle of the upper bridge switch HG and the duty cycle of the lower bridge switch LG are illustrated in the following.

The switching unit 330 includes proper logics, circuits or codes and is configured to control the boost control logic 310 to be connected to the upper bridge switch HG and the lower bridge switch LG, or control the buck control logic 320 to be connected to the upper bridge switch HG and the lower bridge switch LG. Specifically, when the switching unit 330 receives the first detecting signal S1 at high level, the switching unit 330 is connected to the boost control logic 310, the gate of the upper bridge switch HG and the gate of the lower bridge switch LG, such that the upper bridge switch HG is turned on or off according to the first pulse width modulation signal and the lower bridge switch LG is turned on or off according to the second pulse width modulation signal, to adjust the first charging current ICHG1.

On the other hand, when the switching unit 330 receives the second detecting signal S2 at high level, the switching unit 330 is connected to the buck control logic 320, the gate of the upper bridge switch HG and the gate of the lower bridge switch LG, such that the upper bridge switch HG is turned on or off according to the third pulse width modulation signal and the lower bridge switch LG is turned on or off according to the fourth pulse width modulation signal, to adjust the second charging current ICHG2.

Briefly, the switching unit 330 can control the boost control logic 310 and the buck control logic 320 according to the working state of the charging module 30, such that the magnitude and flowing direction of the current passing through the inductor L changes, which further changes the magnitude and flowing direction of the current IPWM of the charging module shown in FIG. 2.

When the charging module 30 works in the buck mode, the current passing through the inductor L is the first charging current ICHG1 flowing from the upper bridge switch HG and the lower bridge switch LG to the energy storage unit BAT. When the charging module 30 works in the boost mode, the current passing through the inductor L is the second charging current ICHG2 flowing from the energy storage unit BAT to the upper bridge switch HG and the lower bridge switch LG. In this embodiment, the current flowing from the upper bridge switch HG and the lower bridge switch LG to the energy storage unit BAT is defined as a positive current, and the current flowing from the energy storage unit BAT to the upper bridge switch HG and the lower bridge switch LG is defined as a negative current.

The boost control logic 310 records a first current lower bound of the lower bridge switch LG and the buck control logic 320 records a second current lower bound of the lower bridge switch LG. The first current lower bound and the second current lower bound indicate whether the negative IL current is allowed or not in the charging module 30. In this embodiment, the first current lower bound is larger than 0, and the second current lower bound equals to 0. The boost control logic 310 adjusts the duty cycle of the first pulse width modulation signal and the duty cycle of the second pulse width modulation signal according to the first current lower bound, and further controls the magnitude and the flowing direction of the current IL passing through the inductor L. Likewise, the buck control logic 320 adjusts the duty cycle of the third pulse width modulation signal and the duty cycle of the fourth pulse width modulation signal according to the second current lower bound, and further controls the magnitude and the flowing direction of the current IL passing through the inductor L. The details about how the boost control logic 310 and the buck control logic 320 adjust the current IL passing through the inductor L according to the first current lower bound and the second current lower bound are illustrated in the following description. Please refer to FIG. 3.

The operation of the charging device CD is illustrated in the following description. FIG. 3 shows a flowchart diagram of a control method used in a charging device of the embodiment of the present disclosure. The control method shown in FIG. 3 can be used in the charging device CD shown in FIG. 1. In this embodiment, the electronic device ED is connected to the charging device CD via the output interface 40. In step S301, the charging device CD is connected to a device that can provide commercial power CP, such as a socket. Receiving the commercial power CP, the adapter 20 starts to provide the adapter current IADP to the charging module 30 to charge the electronic device ED or the energy storage unit BAT. If the energy storage unit BAT has been fully charged, the charging module 30 turns off the upper bridge switch HG and the lower bridge switch LG to stop charging the energy storage unit BAT. As a result, the adapter current IADP provided by the adapter 20 is all inputted to the electronic device ED via the output interface 40.

In Step S302, the detecting unit 300 detects the input current IADP. The magnitude of the input current IADP varies with the load of the electronic device ED. When the electronic device ED needs more electric energy, the adapter 20 provides a larger input current IADP.

In step S303, the detecting unit 300 determines whether the input current IADP is equal to or larger than a preset current. The adapter 20 can provide enough of the electric energy that the electronic device ED needs without the energy storage unit as long as the load current needed by the electronic device ED is not over the preset current of the adapter 20, for example, the preset current can be 1 A. In other words, the preset current refers to the maximum input current IADP that the adapter 20 can provide without being damaged. If the input current IADP is not larger than or not equal to the preset current, and it goes to step S304. If the input current IADP is larger than or equal to the preset current, and it goes to step S306.

In step S304, the detecting unit 300 outputs a second detecting signal S2 at high level to the buck control logic 320 and the switching unit 330, such that the charging module 30 works in the buck mode. After that, switching unit 330 controls the buck control logic 320 to be connected to the gate of the upper bridge switch HG and the gate of the lower bridge switch LG.

In step S305, the buck control logic 320 outputs a third pulse width modulation signal and a fourth pulse width modulation signal to adjust the duty cycle of the upper bridge switch HG and the duty cycle of the lower bridge switch LG. After that, the charging module 30 provides a first charging current ICHG1 to the energy storage unit BAT to charge the energy storage unit BAT. At the same time, the charging module 30 provides an output current ISYS to the output interface 40 to charge the electronic device ED. Briefly, the adapter 20 provides electric energy to the electronic device ED and the energy storage unit BAT simultaneously, wherein the input current IADP equals to the sum of the output current ISYS and the first charging current ICHG1 in the charging device CD. After that, it goes to step S302 to continually detect the input current IADP.

The second current lower bound of the buck control logic 320 equals to 0. In other words, the negative current is not allowed in the buck control logic 320, and thus the current flowing from the drain of the lower bridge switch LG to the source of the lower bridge switch LG is zero.

In step S306, the detecting unit 300 detects that the input current IADP provided by the adapter 20 is over the preset current, and thus the load current that the electronic device ED needs cannot be entirely provided by the adapter 20 without damaging the adapter 20. In order to protect the adapter 20 from damaging by a high electric energy, the charging module 30 controls the energy storage unit BAT to provide part of the electric energy that the electronic device ED needs. The detecting unit 300 outputs the first detecting signal S1 at high level to the boost control logic 310 and the switching unit 330, such that the charging module 30 works in the boost mode. After that, the switching unit 330 controls the boost control logic 310 to be connected to the gate of the upper bridge switch HG and the gate of the lower bridge switch LG.

In step S307, the boost control logic 310 outputs the first pulse width modulation signal and the second pulse width modulation signal to adjust the duty cycle of the upper bridge switch HG and the duty cycle of the lower bridge switch LG.

The first current lower bound of the boost control logic 310 is less than zero, such as −4 A to −5 A. In other words, the current flowing from the drain of the lower bridge switch LG to the source of the lower bridge switch LG is allowed to be negative by the boost control logic 310. Thus, the current IL passing through the inductor L can flow inversely. The energy storage unit BAT starts to provide the second charging current ICHG2 to the charging module 30, such that the second charging current ICHG2 is gradually raised. The current IL passing through the inductor L turns to be negative, and the second charging current ICHG2 flows to the electronic device ED via the upper bridge switch HG, and as a result the charging module 30 works in the boost mode. For example, the second charging current ICHG2 can be 2 A. The current flowing within the charging device CD have a relationship such that IADP+ICHG2=ISYS.

On the other hand, because the energy storage unit BAT starts to provide part of the electric energy that the electronic device ED needs, the adapter 20 can adjust the adapter current such that the input current IADP is almost equal to the preset current to protect the adapter 20 from damaging by high electric energy. When the charging module 30 works in the boost mode, the boost control logic 310 repeatedly outputs the first pulse width modulation signal and the second pulse width modulation signal, such that the energy storage unit BAT can dynamically adjust the second charging current ICHG2 to provide enough of the electric energy that the electronic device ED needs.

In step S308, the detecting unit 300 detects the second charging current ICHG2. From the above description, the second charging current ICHG2 varies with a change of the load of the electronic device ED. The detecting unit 300 determines whether the boost mode of the charging module 30 ends according to the second charging current ICHG2.

In step S309, the detecting unit 300 determines whether the second charging current ICHG2 has decreased to 0 or below 0. If the second charging current ICHG2 is not larger than 0 or not equal to 0, and it goes to step S307. The energy storage unit BAT continually provides the second charging current ICHG2 to the charging module 30. If the second charging current ICHG2 is larger than 0 or equal to 0, and it goes to step S310.

In step S310, the load current that the electronic device ED needs has decreased (for example, the load current that the electronic device ED needs has decreased to 0.8 A), such that the second charging current ICHG2 decreases to be larger than or equal to 0. As a result, the adapter 20 can sufficiently provide all electric energy that the electronic device ED needs. Thus, the detecting unit 300 outputs the first detecting signal S1 at low level to the boost control logic 310 and the switching unit 330, and outputs the second detecting signal S2 at high level to the buck control logic 320 and the switching unit 330, such that the charging module 30 ends the boost mode and works in the buck mode again. The buck control logic 320 outputs the third pulse width modulation signal and the fourth pulse width modulation signal to control the duty cycle of the upper bridge switch HG and the duty cycle of the lower bridge switch LG. As a result, the energy storage unit BAT decreases the second charging current ICHG2 provided to the charging module 30, and it goes to step S302. In step S302, the detecting unit 300 continues to detect the input current IADP to dynamically determine the working mode of the charging module 30 according to a change of the load of the electronic device ED.

In addition, when the adapter 20 charges the electronic device ED, it can simultaneously charge the energy storage unit BAT to compensate the power consumption of the energy storage unit BAT when the charging module 30 works in the boost mode.

If the adapter current provided by the adapter 20 is again raised to be larger than or equal to the preset current, the charging module 30 will work in the boost mode again, and steps S306 to S310 are repeatedly executed such that the energy storage unit BAT can provide part of the electric energy that the electronic device ED needs.

Figure 4:
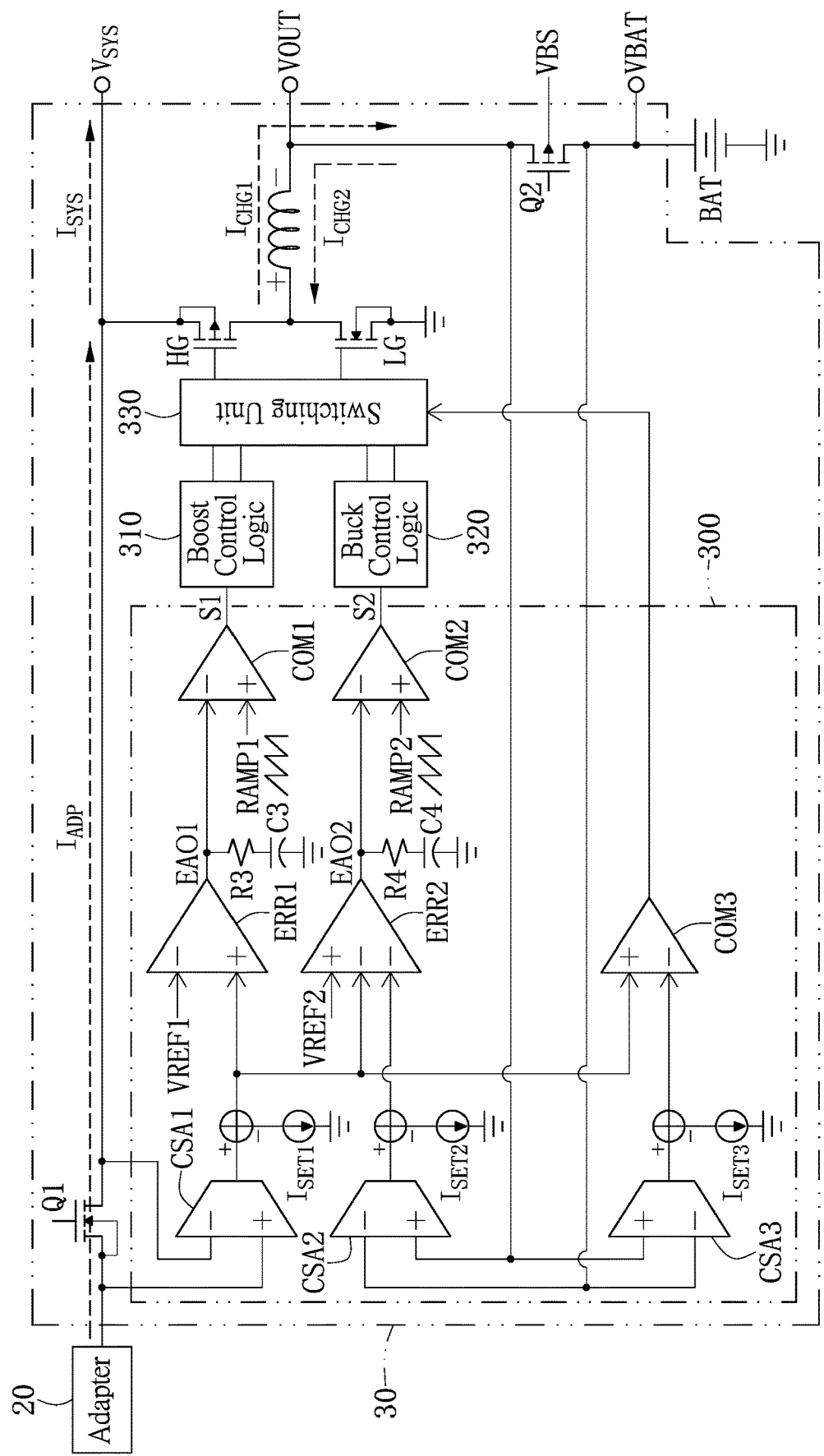
FIG. 4 is a circuit layout diagram of a charging device of a second embodiment of the present disclosure.

Reference is made to FIG. 4, which is a circuit layout diagram of a charging device of a second embodiment of the present disclosure. As shown in FIG. 4, the charging device includes the adapter 20, the energy storage unit BAT and the charging module 30. The charging module 30 is connected to the adapter 20, the energy storage unit BAT and the electronic device.

The charging module 30 receives the adapter current from the adapter 20 and the second charging current ICHG2 from the charging module 30. The charging module 30 provides the first charging current ICHG1 to the energy storage unit BAT and an output current ISYS to the electronic device connected to a system terminal at which a voltage VSYS is provided.

The charging module 30 includes the detecting unit 300, the boost control logic 310, the buck control logic 320, the switching unit 330, the upper bridge switch HG and the lower bridge switch LG.

The detecting unit 300 includes a first current sense amplifier CSA1, a first error amplifier ERR1, a first comparator COM1, a second current sense amplifier CSA2, a second error amplifier ERR2, a second comparator COM2, a third current sense amplifier CSA3 and a third comparator COM3.

The first current sense amplifier CSA1 has a first sense input terminal and a second sense input terminal. The first sense input terminal such as a non-inverting input terminal of the first current sense amplifier CSA1 is connected to a node between the adapter 20 and a first terminal such as a source of a first transistor Q1. The second sense input terminal such as an inverting input terminal of the first current sense amplifier CSA1 is connected to a second terminal such as a drain of the first transistor Q1. The first current sense amplifier CSA1 is configured to sense the input current IADP flowing through the first transistor Q1.

The first error amplifier ERR1 has a first error input terminal and a second error input terminal. The first error input terminal such as an inverting input terminal of the first error amplifier ERR1 is connected to a first reference voltage source VREF1. The first error input terminal of the first error amplifier ERR1 receives a first reference voltage from the first reference voltage source VREF1. The second error input terminal such as a non-inverting input terminal of the first error amplifier ERR1 is connected to a node between an output terminal of the first current sense amplifier CSA1 and a first current source ISET1.

The first error amplifier ERR1 is configured to amplify the difference between the sensed input current IADP flowing through the first transistor Q1 and the first reference voltage source VREF1. The sensed input current IADP is a sum of the first preset current of the first current source ISET1 and a first error current flowing to the second error input terminal of the first error amplifier ERR1 from a node between the output terminal of the first current sense amplifier CSA1 and the first current source ISET1. That is, the first preset current of the first current source ISET1 is subtracted from the input current IADP to obtain the first error current.

The second error input terminal of the first error amplifier ERR1 may be connected to one terminal of a resister (not shown in FIG. 4) and the other terminal of the resister is grounded. The first error current may flow through the resister such that a voltage of the second error input terminal of the first error amplifier ERR1 is equal to a voltage of the resister.

The first error amplifier ERR1 is configured to output a first amplified error signal EAO1 according to the first reference voltage of the first error input terminal of the first error amplifier ERR1 and a voltage of the second error input terminal of the first error amplifier ERR1.

The first comparator COM1 has a first comparator input terminal and a second comparator input terminal. The first comparator input terminal such as an inverting input terminal of the first comparator COM1 is connected to an output terminal of the first error amplifier ERR1. In addition, the first comparator input terminal of the first comparator COM1 is connected to one terminal of a resistor R3. The other terminal of the resistor R3 is connected to one terminal of a capacitor C3. The other terminal of the capacitor C3 is grounded. The second comparator input terminal such as a non-inverting input terminal of the first comparator COM1 is connected to a first ramp generator RAMP1.

An output terminal of the first comparator COM1 is connected to an input terminal of the boost control logic 310. The first comparator COM1 is configured to compare the first amplified error signal EAO1 from the first error amplifier ERR1 with a ramp signal provided by the first ramp generator RAMP1 to output a first comparator signal S1 to the boost control logic 310.

On the other hand, the second current sense amplifier CSA2 has a third sense input terminal and a fourth sense input terminal. The third sense input terminal such as an inverting input terminal of the second current sense amplifier CSA2 is connected to a node between the energy storage unit BAT and a first terminal of a second transistor Q2. The fourth sense input terminal such as a non-inverting input terminal of the second current sense amplifier CSA2 is connected to a second terminal of the second transistor Q2. The second current sense amplifier CSA2 is configured to sense the first charging current ICHG1 flowing through the second transistor Q2 to output the sensed first charging current ICHG1.

The second error amplifier ERR2 has a third error input terminal, a fourth error input terminal and a fifth error input terminal. The third error input terminal such as a non-inverting input terminal of the second error amplifier ERR2 is connected to a second reference voltage source VREF2. The third error input terminal of the second error amplifier ERR2 receives a second reference voltage from the second reference voltage source VREF2. The fourth error input terminal such as an inverting input terminal of the second error amplifier ERR2 is connected to a node between the output terminal of the first current sense amplifier CSA1 and the first current source ISET1. The fifth error input terminal such as an inverting input terminal of the second error amplifier ERR2 is connected to a node between an output terminal of the second current sense amplifier CSA2 and a second current source ISET2.

The sensed first charging current ICHG1 is a sum of the second preset current of the second current source ISET2 and a second error current flowing to the fifth error input terminal of the second error amplifier ERR2 from a node between the output terminal of the second current sense amplifier CSA2 and the second current source ISET2. That is, the second preset current of the second current source ISET2 is subtracted from the sensed first charging current ICHG1 to obtain the second error current.

When a voltage at the fourth error input terminal of the second error amplifier ERR2 is higher than a voltage at the fifth error input terminal of the second error amplifier ERR2, the second error amplifier ERR2 outputs a second amplified error signal EAO2 according to the voltage at the fourth error input terminal of the second error amplifier ERR2 and the second reference voltage of the second reference voltage source VREF2.

Conversely, when the voltage at the fifth error input terminal of the second error amplifier ERR2 is higher than the voltage at the fourth error input terminal of the second error amplifier ERR2, the second error amplifier ERR2 outputs the second amplified error signal EAO2 according to the voltage at the fifth error input terminal of the second error amplifier ERR2 and the second reference voltage of the second reference voltage source VREF2.

The second comparator COM2 has a third comparator input terminal and a fourth comparator input terminal. The third comparator input terminal such as an inverting input terminal of the second comparator COM2 is connected to an output terminal of the second error amplifier ERR2. In addition, the third comparator input terminal of the second comparator COM2 is connected to one terminal of a resistor R4. The other terminal of the resistor R4 is connected to one terminal of a capacitor C4. The other terminal of the resistor C4 is grounded. The fourth comparator input terminal such as a non-inverting input terminal of the second comparator COM2 is connected to a second ramp generator RAMP2. An output terminal of the second comparator COM2 is connected to an input terminal of the buck control logic 320.

The third comparator input terminal of the second comparator COM2 receives the second amplified error signal EAO2 from the second error amplifier ERR2. The fourth comparator input terminal of the second comparator COM2 receives a ramp signal provided by the second ramp generator RAMP2. The second comparator COM2 is configured to compare the second amplified error signal EAO2 with the ramp signal to output a second comparator signal S2 to the buck control logic 320.

The switching unit 330 is connected to the boost control logic 310, the buck control logic 320, the upper bridge switch HG and the lower bridge switch LG, to control the boost control logic 310 or the buck control logic 320 to be connected with the upper bridge switch HG and the lower bridge switch LG.

More specifically, when the charging module 30 operates in the boost mode, the boost control logic 310 is connected to the upper bridge switch HG and the lower bridge switch LG by the switching unit 330, and the switching unit 330 allows the boost control logic 310 to output the first pulse width modulation signal to the upper bridge switch HG and the second pulse width modulation signal to the lower bridge switch LG, to adjust the duty cycle of the upper bridge switch HG and the duty cycle of the lower bridge switch LG;

When the charging module 30 operates in the buck mode, the buck control logic 320 is connected to the upper bridge switch HG and the lower bridge switch LG by the switching unit 330, and the switching unit 330 allows the buck control logic 320 to output the third pulse width modulation signal to the upper bridge switch HG and the fourth pulse width modulation signal to the lower bridge switch LG, to adjust the duty cycle of the upper bridge switch HG and the duty cycle of the lower bridge switch LG.

The third current sense amplifier CSA3 has a fifth sense input terminal and a sixth sense input terminal. The fifth sense input terminal such as a non-inverting input terminal of the third current sense amplifier CSA3 is connected to the second terminal of the second transistor Q2. The sixth sense input terminal such as an inverting input terminal of the third current sense amplifier CSA3 is connected to the node between the energy storage unit BAT and the first terminal of the second transistor Q2.

The third comparator COM3 has a fifth comparator input terminal and a sixth comparator input terminal. The fifth comparator input terminal such as a non-inverting input terminal of the third comparator COM3 is connected to the output terminal of the first current sense amplifier CSA1 and the first current source ISET1. The sixth comparator input terminal such as an inverting input terminal of the third comparator COM3 is connected to an output terminal of the third current sense amplifier CSA3 and a third current source ISET3.

The third current source ISET3 provides a third preset current. For example, the third preset current may be 1 mA or 0 mA, but the present disclosure is not limited thereto. The sensed second charging current ICHG2 or the first charging current ICHG1 is a sum of the third preset current of the third current source ISET3 and a comparator current flowing to the sixth comparator input terminal of the third comparator COM3 from a node between the output terminal of the third current sense amplifier CSA3 and the third current source ISET3. That is, the third preset current of the third current source ISET3 is subtracted from the sensed second charging current ICHG2 or the first charging current ICHG1 to obtain the comparator current. The third comparator COM3 is configured to compare a voltage at the fifth comparator input terminal of the third comparator COM3 with a voltage at the sixth comparator input terminal of the third comparator COM3 to output a third comparator signal to the switching unit 330.

The switching unit 330 allows the boost control logic 310 or the buck control logic 320 to control the upper bridge switch HG and the lower bridge switch LG, according to the first and second pulse width modulation signals outputted from the boost control logic 310 and the third comparator signal, or according to the third and fourth width modulation signals outputted from the buck control logic 320 and the third comparator signal.

When the input current IADP flowing through the first transistor Q1 is larger than the first preset current provided by the first current source ISET1 such that the voltage at the fifth comparator input terminal of the third comparator COM3 is larger than the sixth comparator input terminal of the third comparator COM3, and the first charging current ICHG1 is equal to or less than the third preset current provided by the third current source ISET3, the charging module 30 enters the boost mode.

The boost control logic 310 adjusts the duty cycle of the upper bridge switch HG and the duty cycle of the lower bridge switch LG such that the energy storage unit BAT provides the second charging current ICHG2 to the charging module 30 in the boost mode.

Further, when the second charging current ICHG2 detected by the detecting unit 300 in the boost mode is larger than the third preset current provided by the third current source ISET3 such that the voltage at the sixth comparator input terminal of the third comparator COM3 is larger than the voltage at the fifth comparator input terminal of the third comparator COM3, the charging module 30 enters the buck mode from the boost mode.

The buck control logic 320 adjusts the duty cycle of the upper bridge switch HG and the duty cycle of the lower bridge switch LG, such that the energy storage unit BAT is charged by the first charging current ICHG1 in the buck mode.

Figure 5:
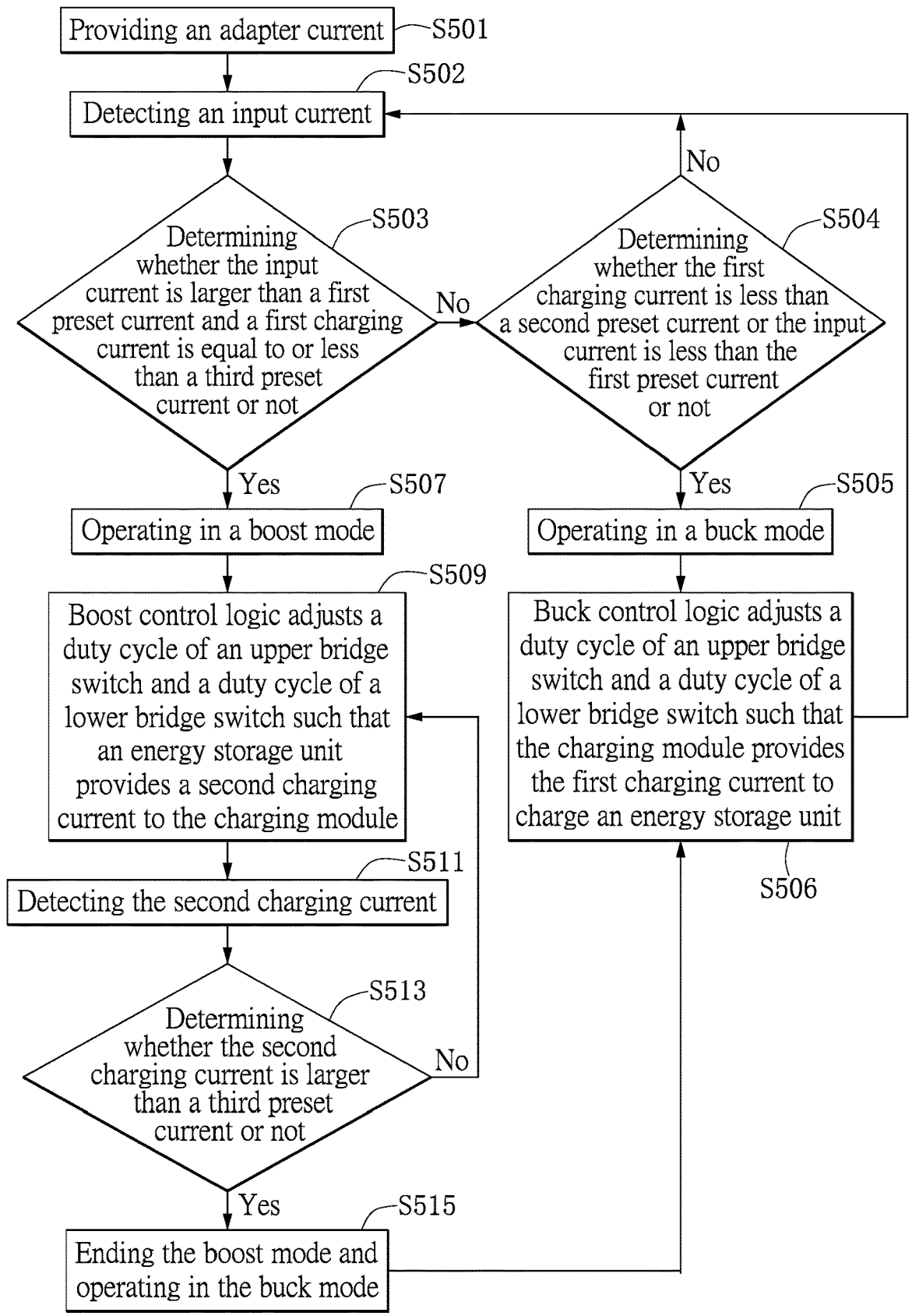
FIG. 5 is a flowchart diagram of a control method used in the charging device of the second embodiment of the present disclosure.

Reference is further made to FIG. 5, which is a flowchart diagram of a control method used in the charging device of the second embodiment of the present disclosure. As shown in FIG. 5, the control method includes the following steps S501 to S515 used in the charging device shown in FIG. 4.

In step S501, the adapter 20 provides the adapter current to the charging module 30 such that the input current IADP flows through the first transistor Q1.

In step S502, the first current sense amplifier CSA1 of the detecting unit 300 detects the input current IADP flowing through the first transistor Q1.

In step S503, it is determined whether the input current IADP flowing through the first transistor Q1 is larger than the first preset current provided by the first current source ISET1 and the first charging current ICHG1 flowing to the energy storage unit BAT from the charging module 30 is equal to or less than the third preset current provided by the third current source ISET3 or not.

If the input current IADP is not larger than the first preset current or the first charging current ICHG1 is not equal to or less than the third preset current, step S504 is performed. In step S504, the second error amplifier ERR2 determines whether the input current IADP is less than the first preset current provided by the first current source ISET1 or the first charging current ICHG1 is less than the second preset current provided by the second current source ISET2 or not.

In step S505, when the input current IADP is less than the first preset current or the first charging current ICHG1 is less than the second preset current, the charging module 30 operates in the buck mode. Conversely, when the input current IADP is not less than the first preset current and the first charging current ICHG1 is not less than the second preset current, step S502 is performed again.

In step S506, the buck control logic 320 of the charging module 30 adjusts the duty cycle of the upper bridge switch HG and the duty cycle of the lower bridge switch LG, such that the energy storage unit BAT is charged by the first charging current ICHG1 in the buck mode.

Conversely, if the input current IADP is larger than the first preset current and the first charging current ICHG1 is equal to or less than the third preset current, step S507 is performed. In step S507, the charging module 30 operates in the boost mode.

In step S509, the boost control logic 310 adjusts the duty cycle of the upper bridge switch HG and the duty cycle of the lower bridge switch LG, such that the energy storage unit BAT provides the second charging current ICHG2 to the charging module 30 in the boost mode.

In step S511, the third current sense amplifier CSA3 of the detecting unit 300 detects the second charging current ICHG2.

In step S513, the third comparator COM3 determines whether the second charging current is larger than the third preset current or not. If the second charging current is not larger than the third preset current, step S509 is performed.

In step S515, if the second charging current is larger than the third preset current, the charging module 30 enters the buck mode from the boost mode and step S506 is performed.

Figure 6:
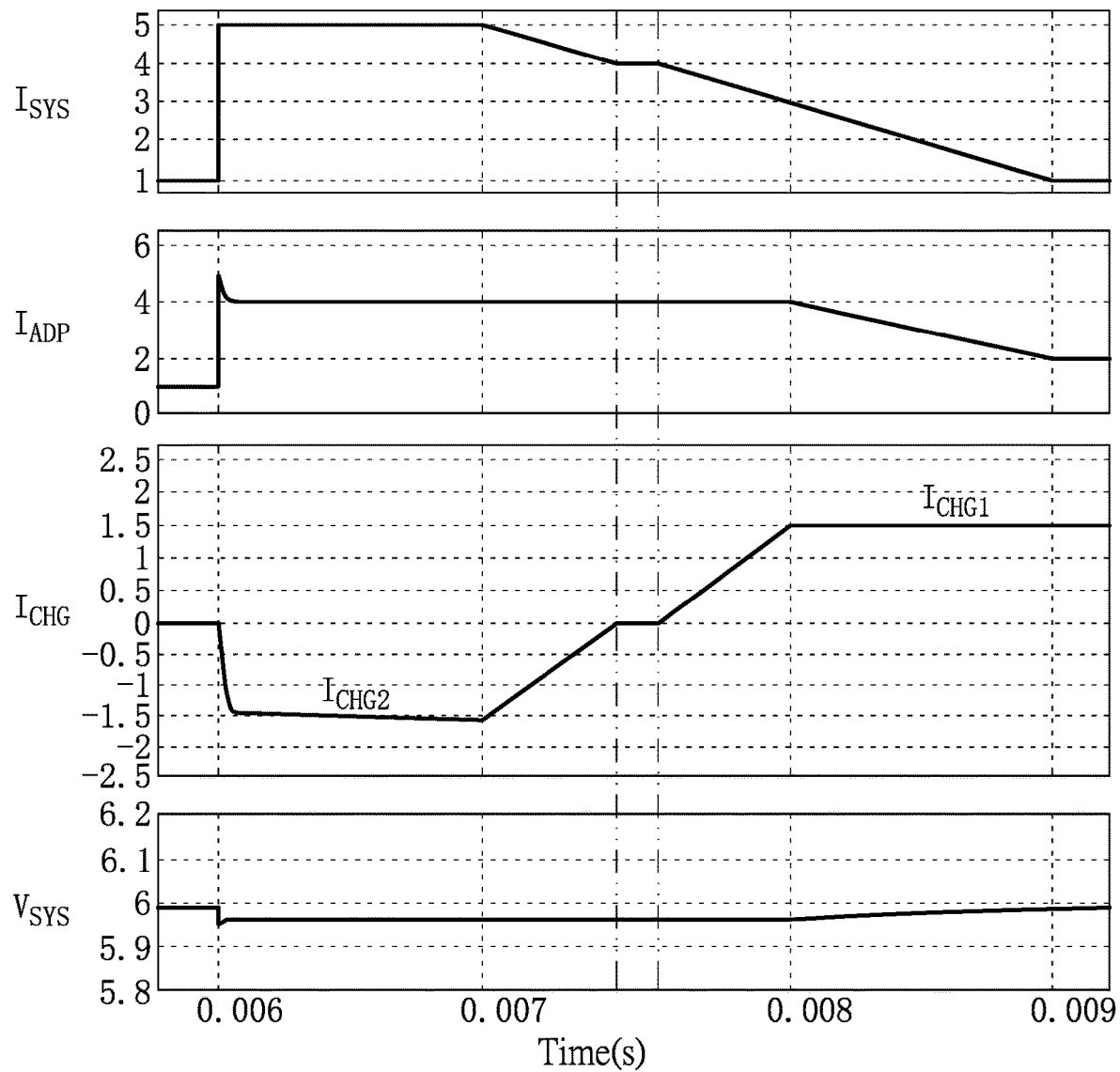
FIG. 6 is a first waveform diagram of signals of the charging device of the embodiments of the present disclosure.

Reference is further made to FIG. 6, which is a first waveform diagram of signals of the charging device of the embodiments of the present disclosure.

As shown in FIG. 6, ISYS represents the output current flowing to the electronic device connected to the system terminal at which the voltage VSYS is provided from the charging module 30. IADP represents the input current flowing through the first transistor Q1. ICHG represents a charging current, which includes the first charging current ICHG1 flowing to the energy storage unit BAT through the second transistor Q2 from the charging module 30 and the second charging current ICHG2 flowing to the charging module 30 through the second transistor Q2 from the energy storage unit BAT. VSYS represents the voltage VSYS of the electronic device.

When the electronic device needs much electric energy, the charging module 30 operates in the boost mode. The charging module 30 provides the higher output current ISYS to the electronic device via the adapter 20 in the boost mode. As a result, the input current IADP flowing through the first transistor Q1 of the charging module 30 increases. The second charging current ICHG2 is provided to the charging module 30 from the energy storage unit BAT, The detecting unit 300 then detects the second charging current ICHG2.

When the electric energy required for the electronic device reduces, the charging module 30 enters the buck mode. The charging module 30 only provides the less output current ISYS to the electronic device via the adapter 20. The energy storage unit BAT stops providing the second charging current ICHG2 to the charging module 30, and the charging module 30 provides the first charging current ICHG1 to the energy storage unit BAT, in the buck mode.

Figure 7:
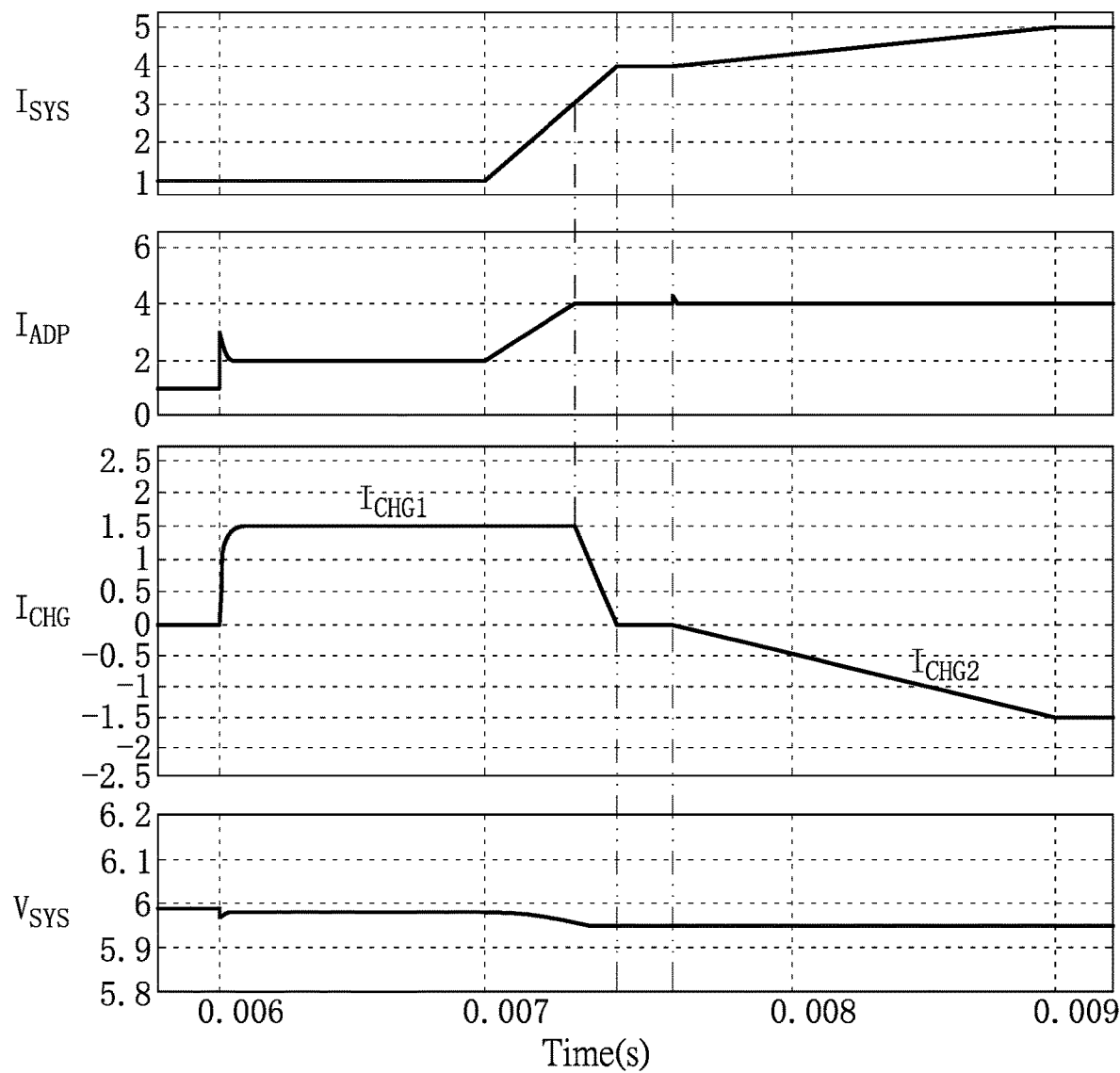
FIG. 7 is a second waveform diagram of signals of the charging device of the embodiments of the present disclosure.

Reference is made to FIG. 7, which is a second waveform diagram of signals of the charging device of the embodiments of the present disclosure.

As shown in FIG. 7, ISYS represents the output current flowing to the electronic device connected to the system terminal at which the voltage VSYS is provided from the charging module 30. IADP represents the input current flowing through the first transistor Q1. ICHG represents a charging current, which includes the first charging current ICHG1 flowing to the energy storage unit BAT through the second transistor Q2 from the charging module 30, and the second charging current ICHG2 flowing to the charging module 30 through the second transistor Q2 from the energy storage unit BAT. VSYS represents the voltage VSYS supplied by the electronic device.

When the electronic device only needs less electric energy, the charging module 30 operates in the buck mode. The charging module 30 only needs to provide the less output current ISYS to charge the electronic device and thus provides the first charging current ICHG1 to charge the energy storage unit BAT in the buck mode at the same time.

When the electronic device needs much electric energy, the charging module 30 enters the boost mode. The charging module 30 needs to provide the higher output current ISYS to the electronic device via the adapter 20. As a result, the input current IADP flowing through the first transistor Q1 of the charging module 30 increases. Thus, the charging module 30 stops providing the first charging current ICHG1 to the energy storage unit BAT and the energy storage unit BAT provides the second charging current ICHG2 to the charging module 30 or directly to the electronic device. The detecting unit 300 then detects the second charging current ICHG2. For example, when the detected second charging current ICHG2 is larger than 0 A, the charging module 30 enters the buck mode.

To sum up, when the load of an electronic device is a heavy load, the charging device and the control method thereof provided by the present disclosure can maintain the input current IADP provided by the adapter at a safe current level, and help the adaptor via the energy storage unit provide power to the electronic device as required by the electronic device. Thereby, the adapter will not be damaged by a high output power thereof. Moreover, the charging device and the control method thereof provided by the present disclosure can dynamically adjust the second charging current provided by the energy storage unit, and can directly detect the second charging current to determine whether to end the boost mode of the charging module. Compared with an energy storage unit of a traditional charging device that can only provide a fixed charging current having a fixed current value that cannot change over time, the charging device and the control method thereof of the present disclosure can provide the first and second charging currents each having variable current values during different time periods. Furthermore, the first and second charging currents are constant during each of the time periods. In detail, the current values of the first and second charging currents may be generated or adjusted according to the input current generated based on the adapter current of the adapter, the first charging current that has supplied to the energy storage unit from the charging module and the second charging current that has supplied to the charging module or the electronic device from the energy storage unit, which are detected by the current sense amplifiers of the detecting unit. Therefore, the charging device of the present disclosure will not work in a wrong mode due to variation or sudden change of the input voltage provided by the adapter.

Additionally, the traditional charging device needs to wait for its processor to determine the working mode, such as the boost mode or the buck mode, according to the present working state, but the charging device and the control method thereof provided by the present disclosure does not, so that they can provide an electric energy to an electric device more quickly. Also, the charging device and the control method thereof provided by the present disclosure can determine to work in the boost mode by only detecting the input current provided by the adapter, and can determine to end the boost mode and work in the buck mode just according to the second charging current provided by the energy storage unit. Therefore, compared with the traditional charging device, the charging device and the control method thereof provided by the present disclosure can respond to a request for charging from an electric device more promptly.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A charging device, used to charge an electronic device, comprising:
    an adapter providing an adapter current;
    an energy storage unit receiving a first charging current and providing a second charging current; and
    a charging module connected to the adapter, the energy storage unit and the electronic device receiving the adapter current and the second charging current, providing the first charging current to the energy storage unit and an output current to the electronic device, wherein the charging module includes:
    a detecting unit, including:
    a first current sense amplifier having a first sense input terminal connected to a node between the adapter and a first terminal of a first transistor, and a second sense input terminal connected to a second terminal of the first transistor;
    a first error amplifier having a first error input terminal connected to a first reference voltage source, and a second error input terminal connected to an output terminal of the first current sense amplifier and a first current source;
    a first comparator having a first comparator input terminal connected to an output terminal of the first error amplifier, and a second comparator input terminal connected to a first ramp generator;
    a second current sense amplifier having a third sense input terminal connected to a node between the energy storage unit and a first terminal of a second transistor, and a fourth sense input terminal connected to a second terminal of the second transistor;
    a second error amplifier having a third error input terminal connected to a second reference voltage source, a fourth error input terminal connected to the output terminal of the first current sense amplifier and the first current source, and a fifth error input terminal connected to an output terminal of the second current sense amplifier and a second current source;
    a second comparator having a third comparator input terminal connected to an output terminal of the second error amplifier, and a fourth comparator input terminal connected to a second ramp generator;

a third current sense amplifier having a fifth sense input terminal connected to the second terminal of the second transistor, and a sixth sense input terminal connected to the node between the energy storage unit and the first terminal of the second transistor;

a third comparator having a fifth comparator input terminal connected to the output terminal of the first current sense amplifier and the first current source, and a sixth comparator input terminal connected to an output terminal of the third current sense amplifier and a third current source;

an upper bridge switch having an upper control terminal connected to an output terminal of the first comparator, a first upper input terminal connected to the second terminal of the first transistor and the electronic device, and a second upper input terminal connected to the second terminal of the second transistor; and a lower bridge switch having a lower control terminal connected to an output terminal of the second comparator, a first lower input terminal connected to the second upper input terminal of the upper bridge switch and the second terminal of the second transistor, and a second lower input terminal is grounded.

2. The charging device according to claim 1, wherein the charging module further includes:
a boost control logic connected to the output terminal of the first comparator and the upper control terminal of the upper bridge switch; and
a buck control logic connected to the output terminal of the second comparator and the lower control terminal of the lower bridge switch.

3. The charging device according to claim 2, wherein when an input current flowing through the first transistor is sensed by the first current sense amplifier and larger than a first preset current provided by the first current source and the first charging current sensed by the third current sense amplifier and is equal to or less than a third preset current provided by the third current source, the charging module operates in a boost mode, the boost control logic adjusts a duty cycle of the upper bridge switch and a duty cycle of the lower bridge switch, such that the energy storage unit provides the second charging current to the charging module.

4. The charging device according to claim 3, wherein when the second charging current sensed by the third current sense amplifier in the boost mode and is larger than the third preset current provided by the third current source, the charging module enters a buck mode from the boost mode, the buck control logic adjusts the duty cycle of the upper bridge switch and the duty cycle of the lower bridge switch, such that the energy storage unit is charged by the first charging current.

5. The charging device according to claim 3, wherein when the input current is less than the first preset current provided by the first current source or the first charging current is less than a second preset current provided by the second current source, the charging module operates in a buck mode, the buck control logic adjusts the duty cycle of the upper bridge switch and the duty cycle of the lower bridge switch, such that the energy storage unit is charged by the first charging current.

6. The charging device according to claim 2, wherein the charging module further includes:
a switching unit connected to the boost control logic, the buck control logic, the upper bridge switch and the lower bridge switch, to control the boost control logic or the buck control logic to be connected with the upper bridge switch and the lower bridge switch;
wherein when the charging module operates in a boost mode, the boost control logic is connected to the upper bridge switch and the lower bridge switch by the switching unit, and the switching unit allows the boost control logic to output a first pulse width modulation signal to the upper bridge switch and a second pulse width modulation signal to the lower bridge switch, to adjust a duty cycle of the upper bridge switch and a duty cycle of the lower bridge switch;
wherein when the charging module operates in a buck mode, the buck control logic is connected to the upper bridge switch and the lower bridge switch by the switching unit, and the switching unit allows the buck control logic to output a third pulse width modulation signal to the upper bridge switch and a fourth pulse width modulation signal to the lower bridge switch, to adjust the duty cycle of the upper bridge switch and the duty cycle of the lower bridge switch.

7. The charging device according to claim 1, wherein the upper bridge switch is a PMOS transistor and the lower bridge switch is a NMOS transistor.

8. A control method used in a charging device according to claim 2, comprising:
step A: detecting the input current flowing through the first transistor;
step B: determining whether the input current flowing through the first transistor is sensed by the first current sense amplifier and larger than the first preset current and the first charging current that is provided to the energy storage unit from the charging module and sensed by the third current sense amplifier and is equal to or less than a third preset current or not, in response to determining that the input current not being larger than the first preset current or the first charging current not being equal to or less than the third preset current, performing step C, in response to determining that the input current being larger than the first preset current and the first charging current being equal to or less than the third preset current, performing steps D and E;
step C: controlling the charging module to operate in the buck mode, adjusting a duty cycle of the upper bridge switch and a duty cycle of the lower bridge switch by the buck control logic, such that the energy storage unit is charged by the first charging current;
step D: controlling the charging module to operate in the boost mode, adjusting the duty cycle of the upper bridge switch and the duty cycle of the lower bridge switch by the boost control logic, such that the energy storage unit provides the second charging current to the charging module; and
step E: determining whether the second charging current sensed by the third current sense amplifier and is larger than the third preset current or not, in response to determining that the second charging current not being larger than the third preset current, performing step D, in response to determining that the second charging current being larger than the third preset current, controlling the charging module to enter the buck mode from the boost mode.

9. The control method according to claim 8, further comprising steps of:
detecting the input current and outputting a first detecting signal to the boost control logic of the charging module by the detecting unit of the charging module; and controlling the upper bridge switch and the lower bridge switch to operate in the boost mode according to the first detecting signal by the boost control logic.

10. The control method according to claim 8, further comprising steps of:
   detecting a voltage difference between the first terminal of the first transistor and the second terminal of the first transistor by the detecting unit; and
   determining whether the input current is larger than the first preset current according to the voltage difference between the first terminal of the first transistor and the second terminal of the first transistor.

11. The control method according to claim 8, when the charging module operates in the boost mode, further comprising steps of:
   connecting the boost control logic to the upper bridge switch and the lower bridge switch through a switching unit of the charging module; and
   outputting a first pulse width modulation signal to the upper bridge switch and a second pulse width modulation signal to the lower bridge switch by the boost control logic, to adjust the duty cycle of the upper bridge switch and the duty cycle of the lower bridge switch.

12. The control method according to claim 8, wherein further comprising steps of:
   detecting the second charging current by the detecting unit of the charging module and outputting a second detecting signal to the buck control logic of the charging module; and
   controlling the upper bridge switch and the lower bridge switch to operate in the buck mode according to the second detecting signal by the buck control logic.

13. The control method according to claim 8, wherein further comprising steps of:
   detecting a voltage difference between the first terminal of the second transistor and the second terminal of the second transistor by the detecting unit; and
   determining whether the second charging current is larger than the third preset current according to the voltage difference between the first terminal of the second transistor and the second terminal of the second transistor.

14. The control method according to claim 8, when the charging module operates in the buck mode, further comprising steps of:
   connecting the buck control logic to the upper bridge switch and the lower bridge switch through a switching unit of the charging module; and
   outputting a third pulse width modulation signal to the upper bridge switch and a fourth pulse width modulation signal to the lower bridge switch by the buck control logic, to adjust the duty cycle of the upper bridge switch and the duty cycle of the lower bridge switch.

* * * * *